United States Patent [19]

Lysen

[11] Patent Number: 5,212,889
[45] Date of Patent: May 25, 1993

[54] PLUMB DEVICE TO DETERMINE VERTICALS AND HORIZONTALS

[75] Inventor: Heinrich Lysen, Munich, Fed. Rep. of Germany

[73] Assignee: Prueftechnik, Ismaning, Fed. Rep. of Germany

[21] Appl. No.: 775,397

[22] Filed: Oct. 15, 1991

[30] Foreign Application Priority Data

Oct. 23, 1990 [DE] Fed. Rep. of Germany ....... 4033630

[51] Int. Cl.$^5$ .............................................. G01C 15/02
[52] U.S. Cl. ...................................... 33/286; 33/291; 33/227
[58] Field of Search ................. 33/227, 228, 273, 286, 33/289, 290, 291, 292, 283, 391, 357, 396; 384/368, 369, 213, 907.1; 403/57, 74, 76; 356/250, 247

[56] References Cited

U.S. PATENT DOCUMENTS

| | | | |
|---|---|---|---|
| 2,521,731 | 9/1950 | Kennedy | 384/213 |
| 2,554,133 | 5/1951 | Von Arx | 33/397 |
| 3,141,242 | 7/1964 | Heath | 33/397 X |
| 3,525,448 | 8/1970 | Bauer | 403/57 X |
| 3,711,171 | 1/1973 | Orkin et al. | 384/907.1 X |
| 3,911,588 | 10/1975 | Ohneda | 33/227 X |
| 4,993,161 | 2/1991 | Borkovitz | 33/291 |
| 5,012,585 | 5/1991 | Di Maggio | 33/227 X |
| 5,054,940 | 10/1991 | Momose et al. | 384/907.1 |

Primary Examiner—Harry N. Haroian
Attorney, Agent, or Firm—Kirkpatrick & Lockhart

[57] ABSTRACT

A plumb device includes a direction determination unit suspended on an upper, movable, convexed portion of a universal joint. A lower, fixed, concaved portion of the movable joint is rigidly connected to a stand by means of a housing. The lower joint part has a lubricant supply line through which a lubricant can be introduced to a groove located on the upper joint part and positioned so as to be between the upper and lower joint parts.

16 Claims, 1 Drawing Sheet

PLUMB DEVICE TO DETERMINE VERTICALS AND HORIZONTALS

BACKGROUND OF THE INVENTION

Field of the Invention

This invention relates to a plumb device for the determination of vertical and horizontal directions, in which a direction determination unit with a luminous source is suspended from a universal joint so that it is freely usable, so that after levelling out in the equilibrium state, a directional light beam from the luminous source indicates the vertical direction.

A plumb device having such characteristics is disclosed, for example, in the German Unexamined Patent Application 25 49 218. To determine directions, it has a suspended, freely-moving image generator, whose optical axis is oriented vertically during the levelling out. The universal joint itself consists of two joint parts, one of which is rigidly connected to the stand housing, while the other can move with the direction determination unit relative to it.

German Unexamined Patent Application 26 34 456 also discloses a ball and socket joint for the vertical orientation of a plumb bob. But the plumb bob can also be suspended by a cardan joint, as disclosed in British Patent Specification 1 375 710, so that it swings freely on a line. However, such suspensions all have certain disadvantages.

The ball and socket joint disclosed in the German Unexamined Patent Application 26 34 456 is not suitable for precision plumb bobs, on account of its internal joint friction, since with small plumb devices in particular, there are only small return forces available for the orientation. Moreover, the joint parts of the suspension must be manufactured with precision, since any imprecision reduces the accurate vertical orientation of the measuring unit. The universal joint disclosed in German Unexamined Patent Application 25 49 218 also has such disadvantages, and even cardan joint suspensions, like those used for example to hold a ship's compass horizontal, are not sufficiently accurate.

An additional advantage of the above-mentioned plumb bobs is that external vibrations—e.g. from a running machine—can be transmitted to the freely suspended masses. The levelling out of the plumb bob can therefore take a very long time. German Unexamined Patent application 25 49 218 discloses an oil damping mechanism to solve this problem, but it reduces the sensitivity.

SUMMARY OF THE INVENTION

The object of the invention is to create a plumb device which, although it is designed so that it is robust and easy to handle, is suitable for a precise determination of vertical and horizontal directions—i.e. with a fluctuation of less than 10 μrad—and does not take a long time to level out.

This object is achieved by means of the apparatus disclosed in patent claim 1, and by the method disclosed in patent claim 9. Preferred embodiments and configurations of the inventions are disclosed in the subclaims.

The plumb device according to the invention, for the determination of the direction, has a luminous source universal joint for the levelling out of a freely movable suspended luminous source, so that under equilibrium conditions, a directional light beam from the luminous source indicates the vertical direction, whereby the joint cup rigidly connected to the stand via the housing has at least one line, by means of which a lubricant can be delivered to the joint via a circular groove in the moving joint head, which is rigidly connected to the direction determination unit.

The advantages of the apparatus according to the invention are primarily in its great accuracy and ease of miniaturization—the overall height of the apparatus can be less than 5 cm—and in the fact that it can be manufactured economically.

The invention also represents a process for the determination of vertical and horizontal directions, in which a luminous source is suspended on a universal joint so that it can move freely—the luminous source is fastened to the joint ball and the joint socket is rigidly connected via the housing to the stand. By means of a line in the joint socket, a lubricant is introduced from below into a groove in the joint ball—preferably under pressure by pmps—and after levelling out into the equilibrium position, the vertical or horizontal direction indicated by the directional light beam is read.

In a preferred embodiment, the luminous source on the joint ball is fastened in rigid suspension. The joint socket and the joint ball then have a passage in the center—i.e. in the axis of the apparatus, so that the vertically oriented, directional light beam can pass through the joint without interference.

It is also particularly preferred if the joint socket and the joint ball are made of glass or glass ceramic, and have the shapes of a concave and a convex hemispherical glass lens. The groove for the lubricant is then circular when viewed from above. Such glass lenses can be manufactured with particularly high precision by grinding and polishing. Joint lenses can be used, the shape of which can be defined to within a few Angstroms. The glass lenses can also be easily inspected by optical interference. The center of motion (radius midpoint of the convex or concave lens curvature) is therefore defined in the plumb device according to the invention with a precision which would otherwise be impossible. The vertical orientation of the light beam in the equilibrium position is thus defined by the midpoint of the lens curvature, which is also the center of motion of the joint, and by the center of gravity of the direction determination unit. It goes without saying that in the manufacture of the plumb device, the light beam must first be adjusted so that it runs vertically through the midpoint of the curvature, or through the center of motion. With a prior deflection into the horizontal, the light beam naturally can be only virtually imaged on the radius midpoint.

When glass or glass ceramic is used, the friction on the contact surfaces represents a certain problem, since glass parts —in the presence of high humidity—are likely to stick together. This problem is solved in accordance with the invention by the introduction, between the joint parts during startup, of a lubricant fluid, preferably a volatile lubricant, into the groove via a feed line in the joint socket. The fluid in the groove causes the movable joint parts on which the direction determination unit is suspended, to be raised up for a short time from the joint socket on account of the vapor pressure or the fluid pressure. The movable part of the joint, supported with practically no friction by a gas or fluid cushion, can then move into the most energetically favorable position. Preferably, a lubricant fluid with internal friction is used, so that in the event of sudden relative movements, it exerts a damping action. The lubricant fluid introduced into the joint according to the invention, when slow relative movements occur, therefore produces a reduction of friction on one hand, and on the other hand a damping of the pendulum movements which is proportional to the speed and acceleration. Preferred lubricant fluids such as diethyl ether, ethanol, methanol, tetrachloroethylene, tetrafluoroethylene, dichlorodifluoroethylene, chloroform, etc. have high vapor pressures.

In an additional preferred embodiment, gases such as air, nitrogen, etc. are injected through the line into the groove, so that the movable parts of the joint on which the direction determination unit is suspended, can be levelled out with no friction, since it is supported by a gas cushion in the most energetically favorable position.

It can also be advantageous to harden the surfaces of the joint parts to reduce the friction. It is also advantageous to chemically modify the surfaces of the joint parts so that contamination and dirt cannot stick, e.g. by a silicon coating of the glass parts.

As the luminous source in the direction determination unit, a laser is preferably used, although theoretically a conventional light source could also be used. Among the various lasers, semiconductor lasers are preferred on account of their low energy requirement. However, conventional lasers such as He-Ne lasers, argon lasers or ruby lasers can also be used. The laser beam is generally directed by optical elements which themselves are part of the prior art. With the required precision, however, it is recommended not to converge the light beam too sharply, to avoid diffraction phenomena. Thus, a light beam with a diameter of 2-10 mm is preferably used for the indication. The required reading accuracy is then achieved by determining the center of gravity of the light beam electronically, e.g. by means of photocells, and with the aid of a position detector.

It is also appropriate to introduce image generation phenomena into the laser beam, so that not only can the vertical or horizontal directions be read, but also deviations from them. Devices which graduate the light beam by degrees are particularly preferred.

In an additional embodiment of the invention, there is a mass which can be moved by means of set crews and springs. This mass is used for the initial adjustment of the center of gravity of the direction determination unit and thus for the calibration of the plumb device.

In an additional preferred embodiment of the invention, a pentagonal prism is located in the vertical light beam of the direction determination unit. The pentagonal prism deflects the light beam by 90°, which now indicates the horizontal axis. The pentagonal prism is preferably integrated in a module which can be attached to the plumb device. The center of motion of the joint is thereby preferably outside the prism, i.e. viewed in the beam direction, it is behind the first inclined prism surface, so that errors in the vertical position of the plumb device housing are compensated. By means of this module, the plumb device can be used for the determination of both the vertical and the horizontal direction.

In an additional configuration of this embodiment, the module or the pentagonal prism, can be rotated around the axis of the plumb device, so that the circulating light beam describes a horizontal plane which is perpendicular to the force of gravity.

BRIEF DESCRIPTION OF THE DRAWINGS

Additional objects, characteristics and advantages of the invention are described below, with reference to the embodiments illustrated in the accompanying drawing.

DESCRIPTION OF A PREFERRED EMBODIMENT

Figure 1:
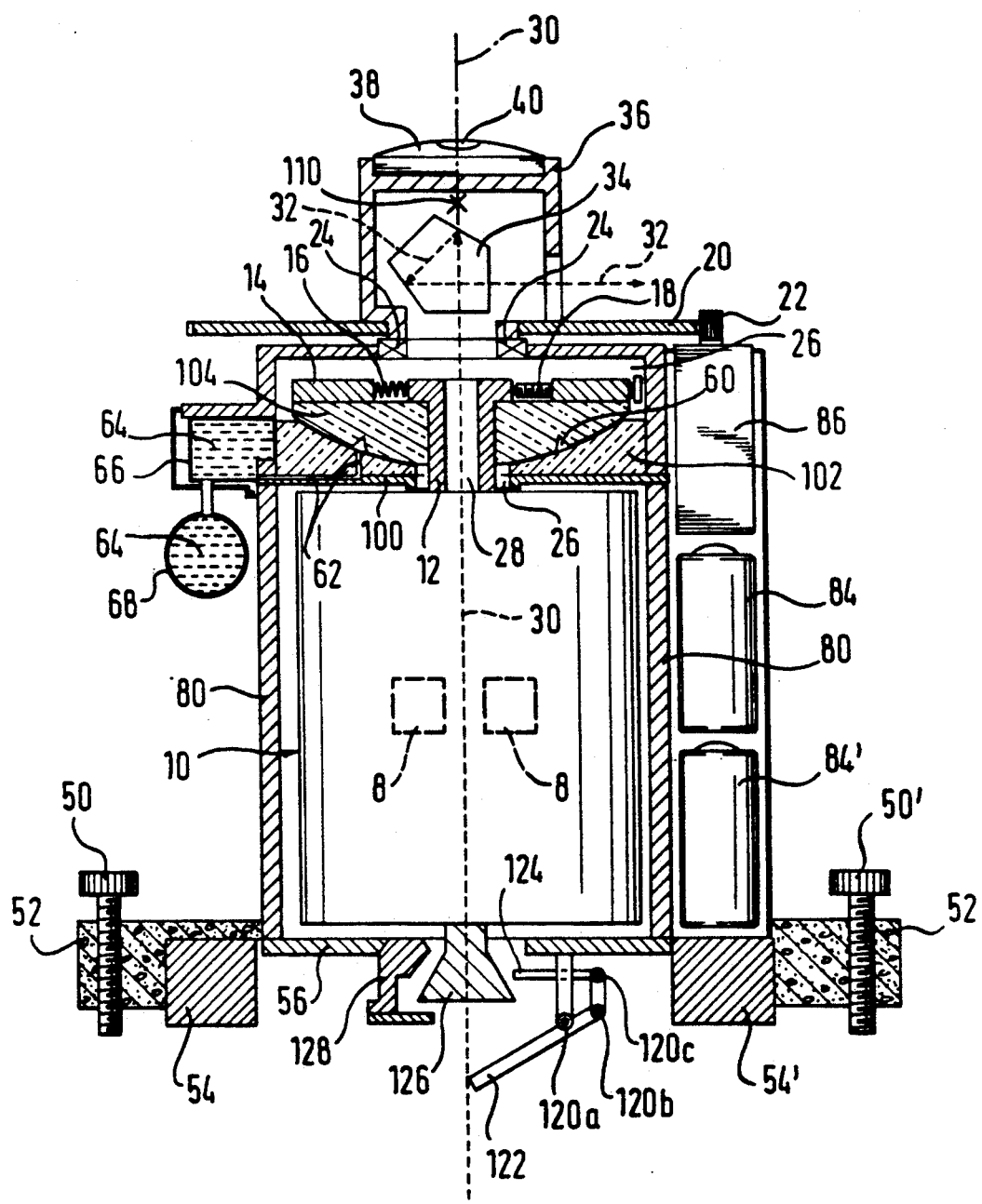
FIG. 1 shows the plumb device according to the invention in longitudinal section, as well as the module with the pentagonal prism.

FIG. 1 shows a plumb device according to the invention with a direction determination unit 10, which consists essentially of a commercially-available semiconductor laser with a power of approximately 1 mW, a power supply unit (storage battery, batteries), several optical elements to focus the light beam to a diameter of 0.7 cm, and an orientation apparatus 8 for the adjustment of the light beam in the direction determination unit. The position of the light beam is determined electronically after levelling out in the vertical or horizontal position by means of a position detector (not shown). The freely movable direction determination unit 10 is rigidly connected by means of a tubular connector 12 to the movable part 104 of the universal joint—the convex, hemispherical joint lens 104. The tubular connector 12 and the convex joint lens 104 have, in the center, along the axis 30 of the apparatus, a passage 28, so that the light beam 32 (part of the light beam 32 coincides with the axis 30 of the apparatus) can pass through the joint without interference after the levelling out. On the convex, hemispherical upper joint part 104 there is an annular counterweight 14, which can be moved in all directions by springs 16 offset from one another by 90° and calibration screws 18 on the upper joint part 104, so that the center of gravity of the direction determination unit 10 can be adjusted. The latter adjustment apparatus is used for the initial vertical calibration of the light beam 32 through the center of motion 110 (radius midpoint of the curvature of the lens) of the joint.

The convex joint lens 104 consists of a glass ceramic body having a low coefficient of thermal expansion. The surface of the convex joint lens deviates from the calculated curvature by less than 1 μm.

The joint lens body 104, in the convex curved surface, has a circular groove 60, which points toward the concavely curved joint socket 102. This groove 60 is supplied with a volatile lubricant 64—ether—via a feed line 62 located in the lower concave joint body 102 by means of a pump 68 from a reservoir 66 located on a similar level. The lubricant 64 thereby penetrates into the boundary layer between the upper and the lower joint parts 102, 104, and thus reduces the friction at the contact surfaces; in the event of rapid relative movements, such movements are damped by the internal friction in the lubricant fluid. The lower concave joint lens body 102 is also made of glass ceramic. It has a hole along its center axis. Below the concavely curved joint socket there is a lens base 100 with a small annular projection near the axis 30 of the apparatus, on one hand to better support the lower ball and socket joint 102, and on the other hand to restrict the freedom of movement of the direction determination unit in the space 26 so that no damage can occur to the joint. The lower concave portion of the ball and socket joint 102 is rigidly connected by the lens base 100 with the housing 80. The housing 80 in turn is connected to the housing floor 56 and consequently with a stand apparatus for positioning on the site. The site for the plumb device can, for example, be a platform, a structure, a piece of equipment of a metal machine part. Thus the stand apparatus has, in addition to the plate 52, in which there are stand set screws 50,50' for adjustment, magnets 54,54', so that the plumb device can be fastened directly to the metal body.

A module with a pentagonal prism 34 can optionally be inserted in the beam path on a pivot bearing 24, to deflect the light beam 32 in the horizontal direction. The center of rotation 110 of the joint—viewed in the vertical beam direction—is thereby a defined distance behind the prism, so that with a slightly oblique positioning of the housing 80 or of the prism 34, a difference in altitude of the horizontally exiting light beam is avoided. The pentagonal prism 34 is located in a rotatable housing 36, which can be displaced around the axis 30 of the apparatus by a toothed wheel 20 and a drive pinion 22 on an electric motor 86. On the housing of the module there is a bubble level 38 with an air bubble 40, which is used for the rough orientation of the plumb device. The motor 86, together with the power supply 84,84', batteries or storage batteries, is located in a separate drive unit housing (not shown), so that the direction determination unit 10 is shielded.

On the housing floor 56 of the plumb device 56 is an automatic transport protection device, which prevents damage to the universal joint or the direction determination unit from vibrations which occur during transport. The automatic transport protection consists of a spring-loaded hinge joint 120a, two additional hinge joints 120b, 120c, a safety cover 122, a safety cone 126 and a bracket 128. If the plumb device is lifted up off the ground, a spring-loaded transport protection cover 122 is released and a locking pin 124 presses the protection cone 126 of the direction determination unit 10 onto a bracket 128. The safety cone 126 is thus locked in place, and along with it the direction determination unit 10.

What is claimed is:

1. Plumb device for the determination of vertical directions, whereby a direction determination unit is suspended on a non-encapsulated universal joint having upper and lower joint parts so that said unit can move freely during a levelling operation, said unit having a luminous source therein for generating a light beam, characterized by the fact that said lower joint part is rigidly connected to a stand by means of a housing, said lower joint part carrying at least one lubricant supply line by means of which a volatile lubricant can be introduced to a groove located on a surface of said upper joint part facing said lower joint part, said upper and lower joint parts each having a passage therethrough such that under equilibrium conditions, said light beam passes through said passages in said upper and lower joint parts to indicate the vertical.

2. Plumb device according to claim 1, characterized by the fact that said movable upper and lower joint parts have an opening in the center thereof for the diffractionless passage of the vertical light beam.

3. Plumb device according to claim 1, characterized by the fact that said upper and lower joint parts are made from a material selected from the group consisting of glass and glass ceramic.

4. Plumb device according to claim 1, wherein said luminous source comprises a laser for generating said light beam.

5. Plumb device according to claim 1, characterized by the fact that an annular, movable mass is located on the upper joint part to adjust the center of gravity of the direction determination unit.

6. Plumb device according to claim 1, characterized by the fact that the lubricant is made from a substance selected from the group consisting of (i) a liquid with a high vapor pressure and (ii) a gas.

7. Process for the determination of vertical axes with a plumb device having a non-encapsulated upper movable joint part and a lower fixed joint part each having a passage therethrough, whereby the luminous source is fastened to said movable joint part and said fixed joint part is rigidly fastened to a stand device by means of a housing; said process characterized by providing a volatile lubricant, via a line in said fixed joint part, from below to a groove in said movable joint part, and after an equilibrium position has been reached, reading the vertical direction by means of a light beam produced by said luminous source that passes through said passages in said upper and lower joint parts.

8. Process according to claim 7 wherein said volatile lubricant is one of (i) a fluid with a high vapor pressure and (ii) a gas.

9. A plumb device for the determination of vertical and horizontal directions comprising:
   a housing supportable on a surface;
   a universal joint attached to said housing, said universal joint having upper and lower joint parts each having a passage therethrough, said lower joint part attached to said housing and having at least one lubricant supply line by means of which a volatile lubricant can be introduced to a groove located on a surface of said upper joint part facing said lower joint part;
   a direction determination unit suspended on said universal joint such that said unit can move freely during a levelling operation;
   a luminous source for generating a light beam attached to said direction determination unit such that under equilibrium conditions said light beam passes through said passages in said upper and lower joint parts to indicate the vertical; and
   an optical element removably attachable to said housing such that when attached to said housing said optical element is positioned in the path of said light beam to deflect said light beam 90° to determine said horizontal direction.

10. Plumb device according to claim 9, characterized by the fact that said upper and said lower joint parts are made from a material selected from the group consisting of glass and glass ceramic.

11. Plumb device according to claim 9, wherein said luminous source comprises a laser for generating said light beam.

12. Plumb device according to claim 9, characterized by the fact that an annular, movable mass is located on the upper joint part to adjust the center of gravity of the direction determination unit.

13. Plumb device according to claim 9 wherein said optical element comprises a prism rotatably mounted about an axis in the path of the light beam.

14. Plumb device according to claim 9 characterized by the fact that the lubricant is made from a substance selected from the group consisting of (i) a liquid with a high vapor pressure and (ii) a gas.

15. Process for the determination of vertical and horizontal axes comprising the steps of:
   providing a plumb device having a housing and a universal joint attached to said housing, said universal joint having non-encapsulated upper and lower joint parts each having a passage therethrough, said lower joint part being attached to said housing and having at least one lubricant supply line by means of which a volatile lubricant can be introduced to a groove located on a surface of said upper joint part facing said lower joint part, a direction determination unit suspended on said universal joint such that said unit can move freely during a levelling operation, and a luminous source for generating a light beam attached to said direction determination unit such that under equilibrium conditions said light beam passes through said passages in said joint parts to indicate the vertical;

placing said plumb device on a surface;

determining said vertical direction by observing said light beam;

attaching an optical element to said housing of said plumb device such that said light beam is deflected 90°; and determining said horizontal direction by observing said light beam.

16. Process for the determination of vertical and horizontal axes comprising the steps of:

providing a plumb device having a housing and a universal joint attached to said housing, said universal joint having non-encapsulated upper and lower joint parts each having a passage therethrough, said lower joint part being attached to said housing and having at least one lubricant supply line by means of which a volatile lubricant can be introduced to a groove located on a surface of said upper joint part facing said lower joint part, a direction determination unit suspended on said universal joint such that said unit can move freely during a levelling operation, and a luminous source for generating a light beam attached to said direction determination unit such that under equilibrium conditions said light beam passes through said passages in said upper and lower joint parts to indicate the vertical;

placing said plumb device on a surface;

attaching an optical element to said housing of said plumb device such that said light beam is deflected 90°;

determining said horizontal direction by observing said light beam;

detaching said optical element from said housing; and determining said vertical direction by observing said light beam.

* * * * *

UNITED STATES PATENT AND TRADEMARK OFFICE
CERTIFICATE OF CORRECTION

PATENT NO. : 5,212,889
DATED : May 25, 1993
INVENTOR(S) : Heinrich Lysen

It is certified that error appears in the above-identified patent and that said Letters Patent is hereby corrected as shown below:

Col. 2, line 55, after "parts" insert --in particular--.

Signed and Sealed this

Twenty-first Day of December, 1993

Attest:

BRUCE LEHMAN

Attesting Officer

Commissioner of Patents and Trademarks